United States Patent
Ahn et al.

(10) Patent No.: US 9,053,721 B1
(45) Date of Patent: Jun. 9, 2015

(54) MAGNETIC READ SENSOR WITH INDEPENDENTLY EXTENDED PINNED LAYER AND SEED LAYER

(71) Applicant: HGST Netherlands B.V., Amsterdam (NL)

(72) Inventors: Yongchul Ahn, San Jose, CA (US); David P. Druist, Santa Clara, CA (US); Zheng Gao, San Jose, CA (US); Ying Hong, Morgan Hill, CA (US); Yunhe Huang, Pleasanton, CA (US); Quang Le, San Jose, CA (US); Thomas L. Leong, San Jose, CA (US); Guangli Liu, Pleasanton, CA (US); Xiaoyong Liu, San Jose, CA (US); David J. Seagle, Morgan Hill, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/292,760

(22) Filed: May 30, 2014

(51) Int. Cl.
G11B 5/39 (2006.01)
G11B 5/33 (2006.01)
G11B 5/127 (2006.01)

(52) U.S. Cl.
CPC ..................................... *G11B 5/398* (2013.01)

(58) Field of Classification Search
CPC ........... G11B 2005/3996; G11B 5/398; G11B 5/3906; G11B 5/3903; G11B 5/3929
USPC ....................................... 360/319, 324–324.2
See application file for complete search history.

(56) References Cited

U.S. PATENT DOCUMENTS

| | | | |
|---|---|---|---|
| 6,519,121 B1 | 2/2003 | Gill | |
| 6,888,706 B2 | 5/2005 | Ooshima | |
| 7,220,499 B2 | 5/2007 | Saito et al. | |
| 7,382,590 B2 | 6/2008 | Doerner et al. | |
| 7,436,637 B2 * | 10/2008 | Pinarbasi | 360/324.11 |
| 8,259,419 B2 | 9/2012 | Fukuzawa et al. | |
| 8,385,025 B2 | 2/2013 | Maat et al. | |
| 8,451,567 B2 | 5/2013 | Zhou et al. | |
| 8,711,528 B1 * | 4/2014 | Xiao et al. | 360/324.11 |
| 2002/0015268 A1 | 2/2002 | Mao et al. | |
| 2006/0002042 A1 * | 1/2006 | Gill | 360/324.12 |
| 2006/0023373 A1 * | 2/2006 | Gill | 360/324.11 |
| 2014/0133052 A1 * | 5/2014 | Meguro et al. | 360/234.3 |

* cited by examiner

*Primary Examiner* — Will J Klimowicz
(74) *Attorney, Agent, or Firm* — Zilka-Kotab, PC

(57) ABSTRACT

A magnetic read sensor having a magnetic seed layer, a pinned layer structure formed over the magnetic seed layer, a non-magnetic barrier or spacer layer formed over the pinned layer structure and a magnetic free layer structure formed over the non-magnetic barrier or spacer layer. The pinned layer has a stripe height (measured from the media facing surface) that is greater than a stripe height of the magnetic free layer structure. In addition, the magnetic seed layer structure has a stripe height (also measured from the media facing surface) that is greater than the stripe height of the magnetic pinned layer structure and the magnetic free layer structure. The stripe height of the magnetic seed layer structure can be controlled independently of the stripe heights of the magnetic pinned layer structure and the magnetic free layer structure.

14 Claims, 22 Drawing Sheets

MAGNETIC READ SENSOR WITH INDEPENDENTLY EXTENDED PINNED LAYER AND SEED LAYER

FIELD OF THE INVENTION

The present invention relates to magnetic data recording and more particularly to a magnetic sensor having an extended pinned layer and independently extended seed layer for improved reliability and sensor robustness.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

As sensor sizes become ever smaller in order to accommodate increased data density requirements, sensor stability becomes ever more difficult to achieve. For example, it becomes ever more difficult to maintain strong pinned layer pinning strength at very small sensor sizes. Therefore, there remains a need for a sensor design that can achieve strong pinning strength even at extremely small sensor sizes and at elevated operating temperatures.

SUMMARY

The present invention provides a magnetic sensor that includes a seed layer structure, a magnetic pinned layer structure formed over the seed layer structure, a non-magnetic layer formed over the pinned layer structure and a magnetic free layer structure formed over the non-magnetic layer. The magnetic free layer structure extends to a first stripe height measured from a media facing surface, and the magnetic pinned layer structure extends to a second stripe height measured from the media facing surface that is greater than the first stripe height. The seed layer structure extends to a third stripe height measured from the media facing surface that is greater than the first and second stripe heights.

The free layer can be formed with a width that defines a sensor track-width and the seed layer and pinned layer structures can both extend laterally beyond the sides of the magnetic free layer, thereby extending laterally beyond the track-width.

The seed layer can include a magnetic material. More specifically, the seed layer can be constructed as a layer of magnetic material that is sandwiched between first and second thin layers of Ru. The magnetic material layer and first and second layers or Ru can be formed on a layer of material such as CoHf.

The novel extended shape of the seed layer structure advantageously prevent shunting of sense current. In addition, this configuration allows the seed layer to function as a part of the bottom magnetic shield, thereby reducing gap spacing and increasing data density.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
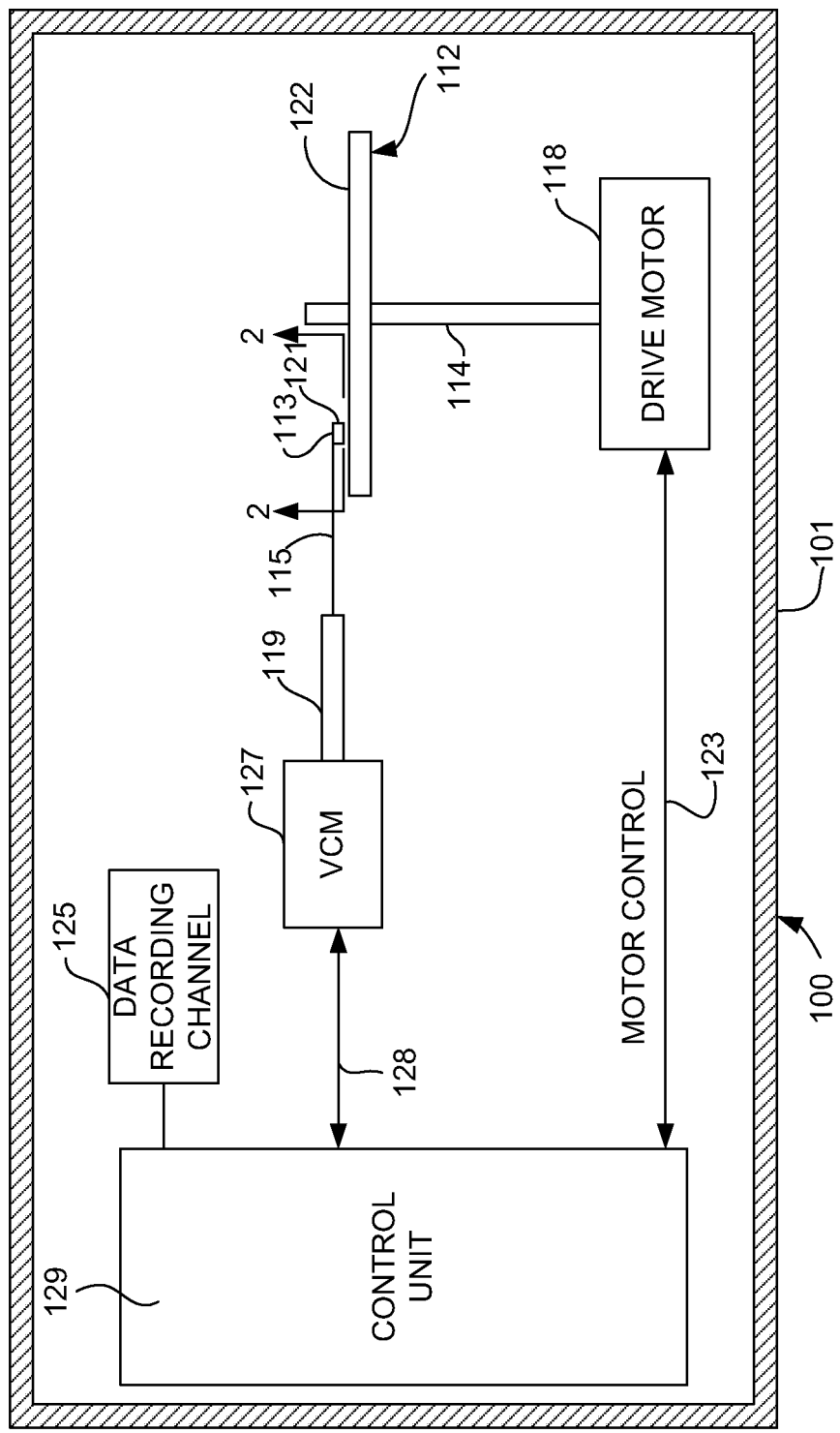
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface 122 by a small, substantially constant spacing during normal operation.

The various components of the disk storage system are controlled in operation by control signals generated by control unit 129, such as access control signals and internal clock signals. Typically, the control unit 129 comprises logic control circuits, storage, means and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
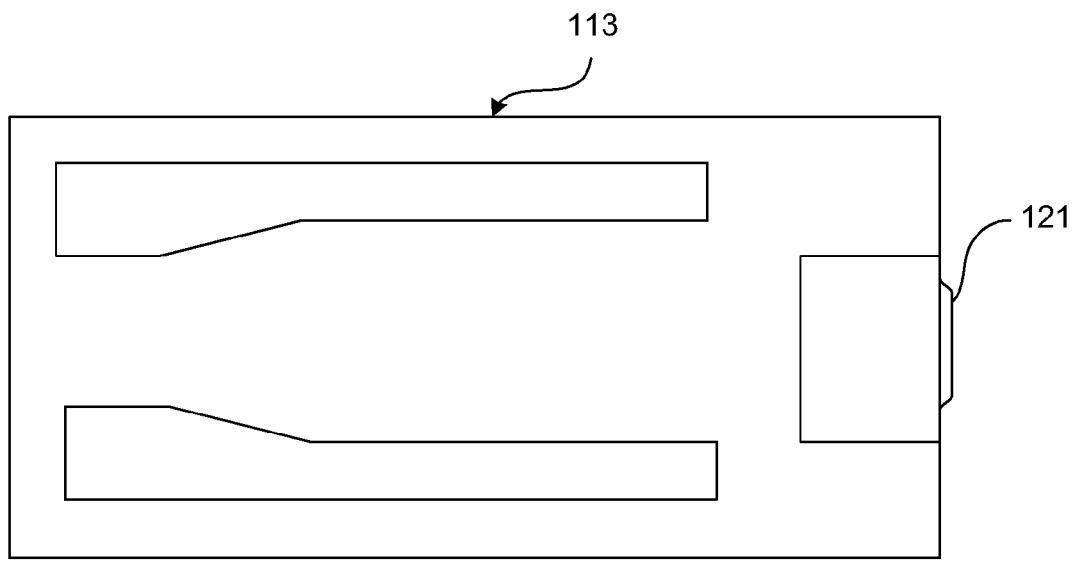
FIG. 2 is a view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen, the magnetic 121 head, including an inductive write head and a read sensor, is located at a trailing edge of the slider. The above description of a typical magnetic disk storage system and the accompanying illustration of FIGS. 1 and 2 are for representation purposes only. It should be apparent that the disk storage system may contain a large number of disks and actuators, and each actuator may support a number of sliders.

Figure 3:
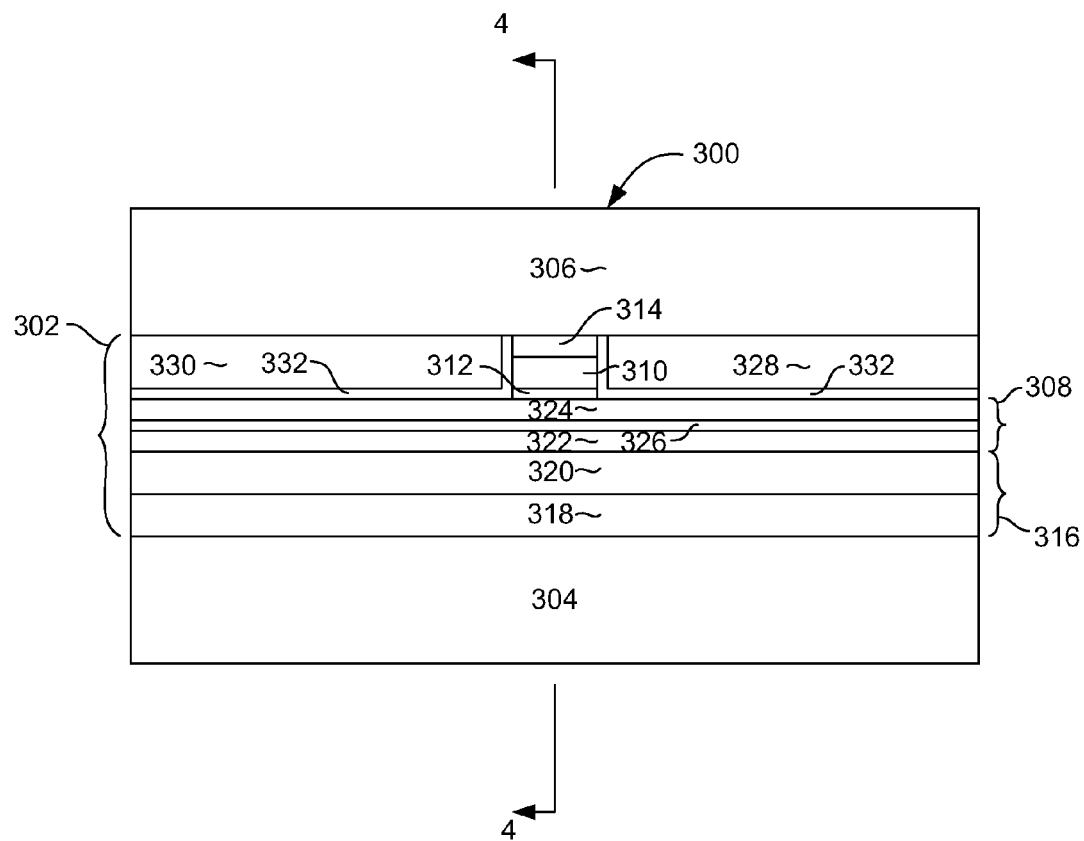
FIG. 3 is a media facing surface view of a magnetic sensor.

FIG. 3, shows a magnetic sensor 300 as viewed from the media facing surface. The sensor 300 includes a sensor stack 302 that is sandwiched between first and second magnetic shields 304, 306. The shields 304, 306 can be constructed of an electrically conductive, magnetic material such as NiFe so that they can function as electrical leads as well as magnetic shields.

The sensor stack 302 includes a pinned layer structure 308, a magnetic free layer structure 310, and a non-magnetic barrier or spacer layer 312 sandwiched between the pinned layer structure 308 and free layer structure 310. A capping layer 314 can be formed over the magnetic free layer structure 310. The pinned layer structure 308 is formed on a pinning structure 316. The pinning structure 316 includes a magnetic seed layer structure 318, and a layer of antiferromagnetic material (AFM layer) 320 such as IrMn formed over the magnetic seed layer 318. The seed layer structure 318 can include: a layer of CoHf (40 Angstroms); a first layer of Ru (12 Angstroms) formed over the layer of CoHf; a layer of NiFe (200 Angstroms) formed over the layer of CoHf; and a second layer of Ru (12 Angstroms) formed over the layer of NiFe. So, the NiFe can be sandwiched between first and second layers of Ru. The materials and suggested thickness are by way of example only.

The pinned layer structure 308 can include first and second magnetic layers 322, 324 that are anti-parallel coupled across a non-magnetic anti-parallel coupling layer such as Ru 326 that is sandwiched between the first and second magnetic layers 322, 324. The first magnetic layer 322 of the pinned layer structure 316 is exchange coupled with the layer of anti-ferromagnetic material 320, which strongly pins the magnetization of the first magnetic layer 322 in a first direction that is perpendicular to the media facing surface (i.e. into or out of the plane of the page in FIG. 3) The anti-parallel coupling between the first and second magnetic layers 322, 324 across the anti-parallel coupling layer 326 causes the magnetization of the second magnetic layer 324 to be pinned in a second direction that is perpendicular to the media facing surface and opposite to the first direction.

With continued reference to FIG. 3, the sensor 300 also includes magnetic bias structures 328, 330, that can be in the form of soft magnetic side shields located at either side of the magnetic free layer structure 310 and capping layer 314. The soft magnetic side shields can be constructed of a magnetic material such as NiFe and are separated from the sensor stack 302 (i.e. sides of the free layer 310 and capping layer 314 and top of the pinned layer structure 308) by a non-magnetic, electrically insulating layer such as silicon nitride 332. The magnetic side shields 328, 330 can be magnetically coupled with the upper shield 306 and they provide a magnetic field that biases the magnetization of the magnetic free layer structure 310 in a direction that is generally parallel with the media facing surface (i.e. left to right or right to left in FIG. 3). Alternatively, the magnetic bias structures 328, 330 can be hard magnetic bias structures constructed of a material having a high magnetic coercivity CoPt or CoPtCr. In FIG. 3, it can be seen that the pinned layer structure 308 and pinning layer structure 316 extend beyond the sides of the free layer structure 310. This allows the sensor 300 to achieve high special resolution and track density while also maintaining strong, robust pinning of the magnetic pinned layer magnetization. Also as can be seen in FIG. 3, the seed layer 318 can extend laterally beyond the pinned layer structure 308.

Figure 4:
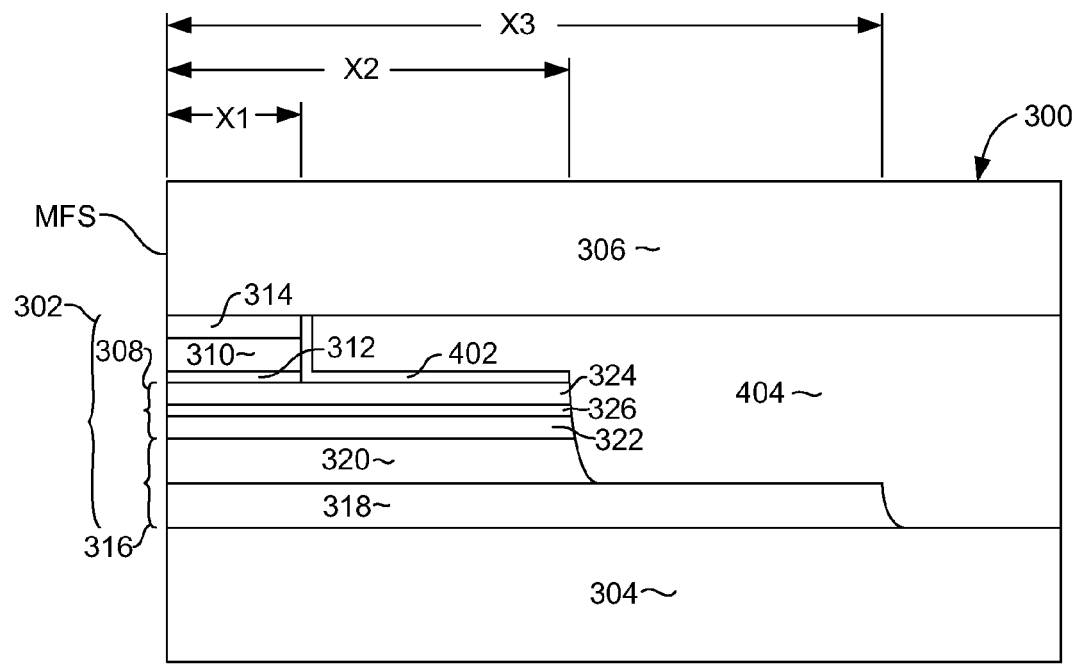
FIG. 4 is a side cross sectional view of the magnetic sensor.

FIG. 4 shows a side cross sectional view of the sensor 300 as seen from line 4-4 of FIG. 3. The left side of the sensor forms the media facing surface MFS. As can be seen in FIG. 4, the magnetic free layer 310 and capping layer 314 extend to a first stripe height distance X1 as measured from the media facing surface MFS. The pinned layer structure 308 and anti-ferromagnetic material layer 320 extend to a second stripe height distance X2 also measured from the media facing surface (MFS), the second stripe height distance X2 being greater than the first stripe height distance X1. The magnetic seed layer 318 of the pinning structure 316 extends to a third stripe height distance X3, also measured from the media facing surface MFS, that is greater than both the first stripe height distance X1 and second stripe height distance X3. This structural arrangement provides several advantages. Firstly, it reduces the chance of shunting of sensor current between the shields 304, 306. Secondly, this structure (formed by a process that will be described below) advantageously allows the stripe height of the seed layer 318 to be defined independently of the extended pinned layer 308 and AFM 320. Independent stripe height definition of the seed layer 318 and pinned layer structure 308 allows the seed layer 318 to form a pseudo shield having a stripe height that is greater than that of the pinned layer structure 308.

Figure 5:
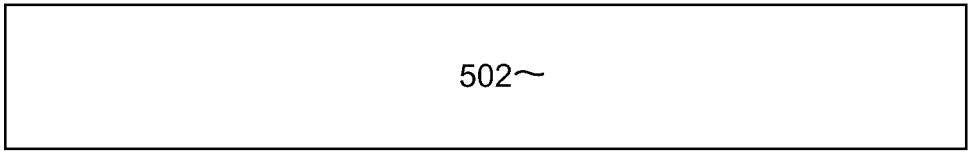
FIGS. 5-22 are views of a magnetic sensor in various intermediate stages of manufacture, illustrating a method of manufacturing a magnetic sensor.

FIGS. 5-22 show a magnetic sensor in various intermediate stages of manufacture in order to illustrate a method for manufacturing a magnetic sensor. With particular reference to FIG. 5, a first magnetic shield 502 is formed. This magnetic shield can be constructed of a material such as NiFe and can be embedded in a non-magnetic dielectric material such as alumina (not shown) and can have a planer upper surface. Then, with reference to FIG. 6, a series of sensor layers is deposited full film over the shield 502. The sensor layers can include: an etch stop layer 503; a magnetic seed layer 504 (which can include a layer of NiFe sandwiched between thin layers of Ru, all of which can be formed on a layer of CoHf); a layer of antiferromagnetic material (AFM layer 506) such as IrMn; a first magnetic pinned layer 508; an anti-parallel coupling layer such as Ru 510; a second magnetic pinned layer 512 a non-magnetic spacer or barrier layer 514; a magnetic free layer structure 516; and a capping layer 518. The first and second magnetic pinned layers 508, 512 and anti-parallel coupling layer 510 define a pinned layer structure 620.

Figure 6:
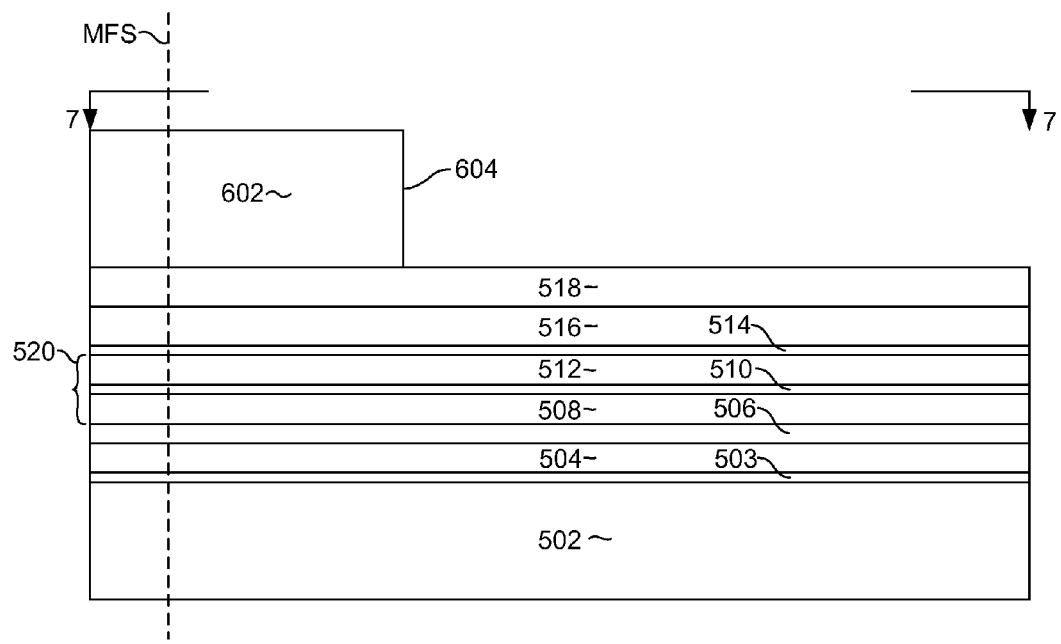
Figure 7:
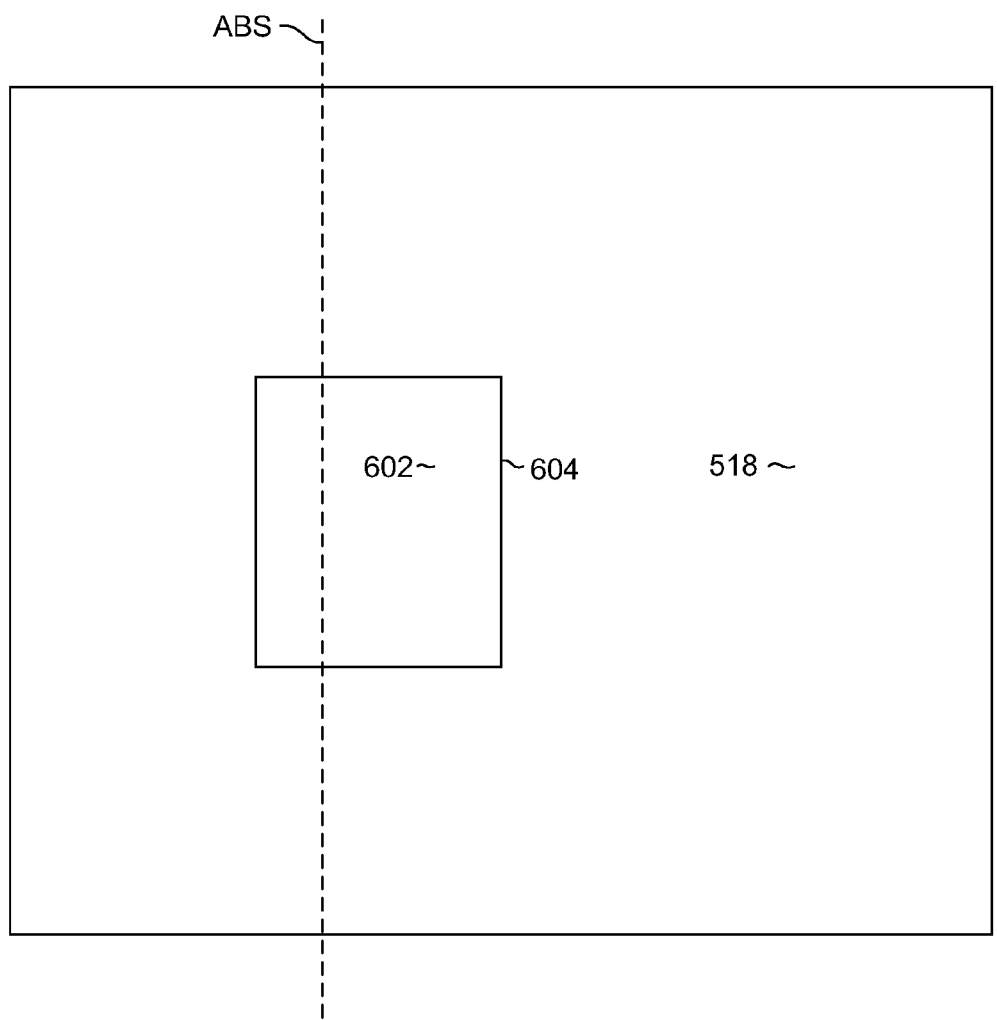

With continued reference to FIG. 6, a first mask structure 602 is formed over the series of sensor layers 503-518. The first mask 602 has a back edge 604 that is configured to define a stripe height of the free layer 516 and capping layer 518 as measured from a media facing surface plane, the location of which is indicated by the dashed line denoted as MFS. The configuration of the mask 602 can be seen more clearly with reference to FIG. 7, which shows a top down view as seen from line 7-7 of FIG. 6. The first mask structure 602 can be formed of a photolithographically patterned photoresist material, but can also include other layers as well, such as one or more hard mask layers, an image transfer layer, a bottom anti-reflective coating layer (BARC) etc.

Figure 8:
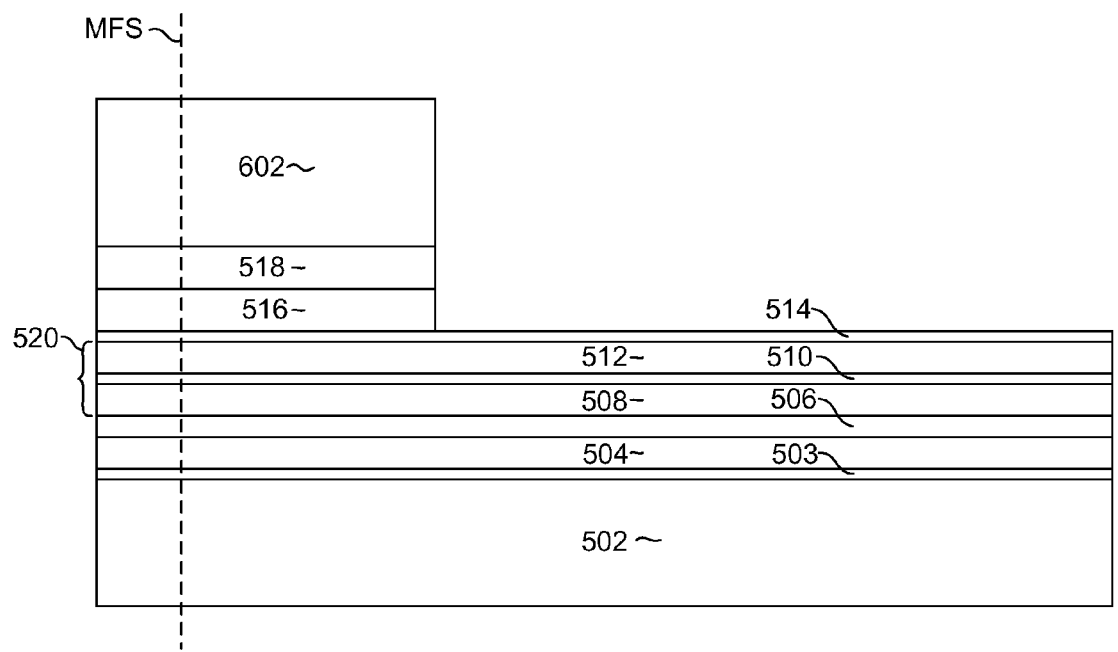
Figure 9:
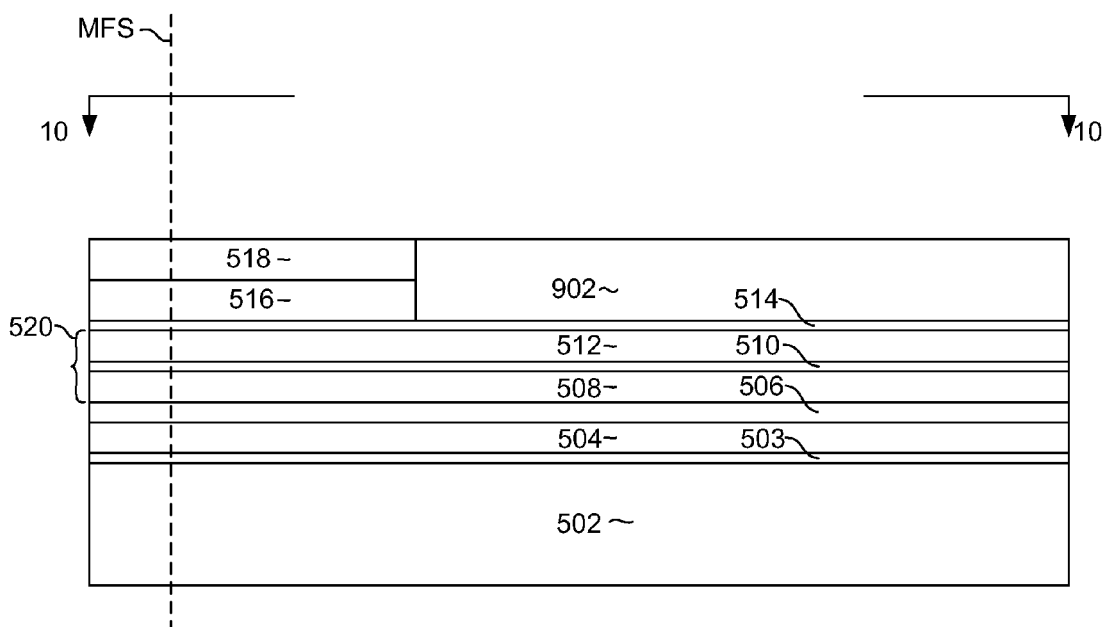

With reference now to FIG. 8, a first ion milling is performed to remove a portion of the sensor layers that are not protected by the first mask structure 602. The first ion milling is performed until unprotected portions of the capping layer 518 and free layer structure 516 have been removed, leaving the under-lying layers 503, 504, 506, 508, 510, 512 and 514 intact (although all or a portion of the layer 514 could be removed). A first non-magnetic, electrically insulating fill layer such as alumina and/or tantalum oxide 902 is then deposited and a mask lift off process and planarization process such as chemical mechanical polishing (CMP) is performed, leaving a structure as shown in FIG. 9.

Figure 10:
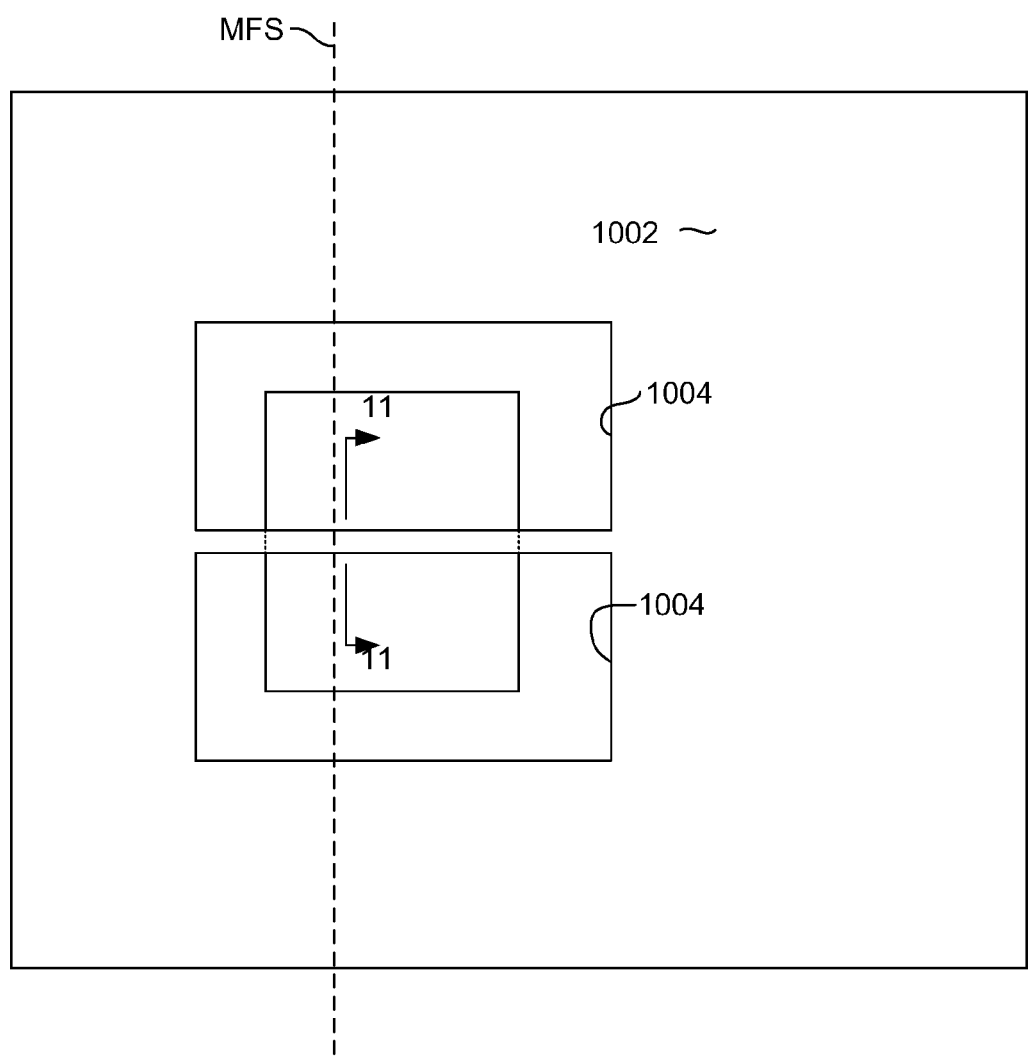
Figure 11:
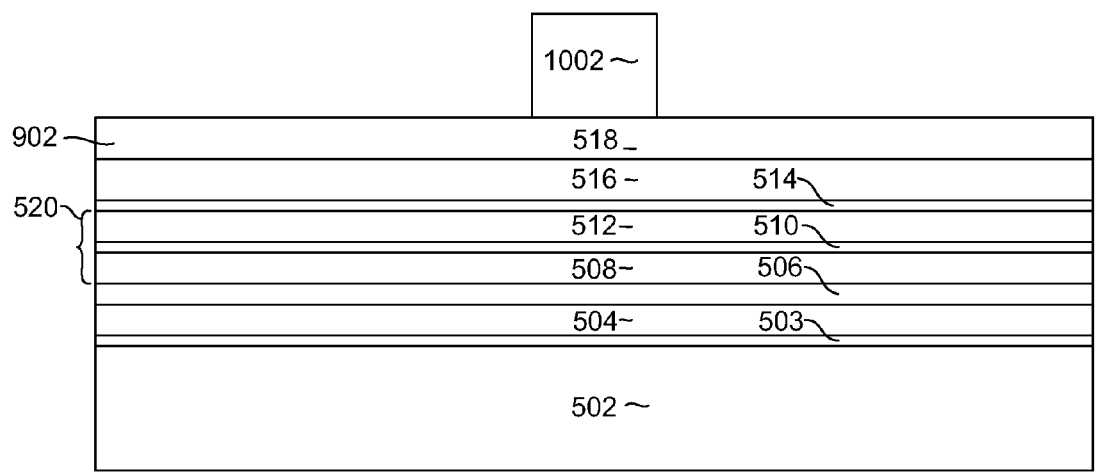

With reference now to FIGS. 10 and 11, a second mask structure 1002 is formed. FIG. 10 is a top down view and FIG. 11 is a cross sectional view as seen from line 11-11 of FIG. 10. The second mask 1002 is a track with defining mask, having openings 1004 between which lies a central portion having a width that is configured to define a free layer track-width as will be seen. As before, the mask 1002 can include a photolithographically patterned photoresist, but can include other layers as well, such as one or more hard mask layers, a release layer, a bottom anti-reflective coating layer, etc.

Figure 12:
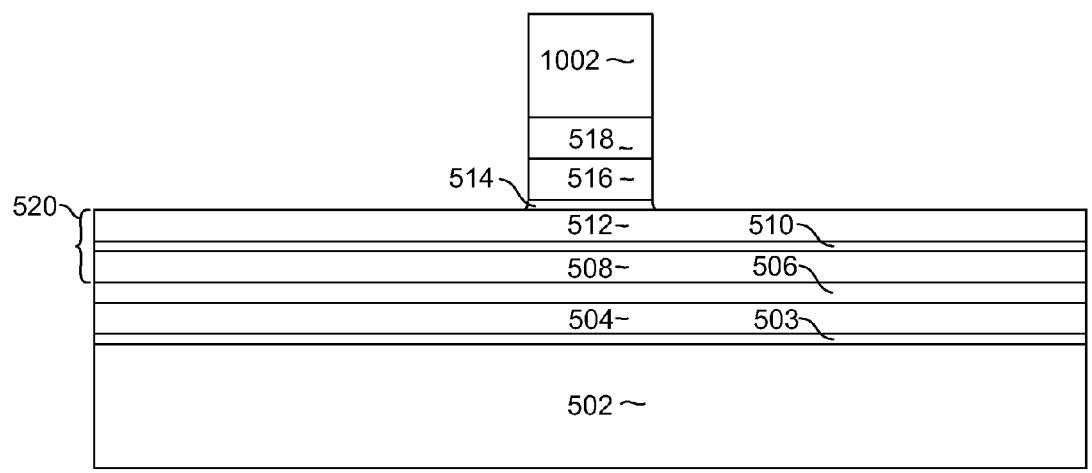

With reference now to FIG. 12, a second ion milling can be performed to remove portions of the capping layer 518, free layer structure 516 and barrier or spacer layer 514 that are not protected by the second mask 1002, leaving a structure as shown in FIG. 12. As can be seen, this leaves the pinned layer structure 520 and underlying layers 503, 504, 506 extending beyond the free layer 516 in the width direction.

Figure 13:
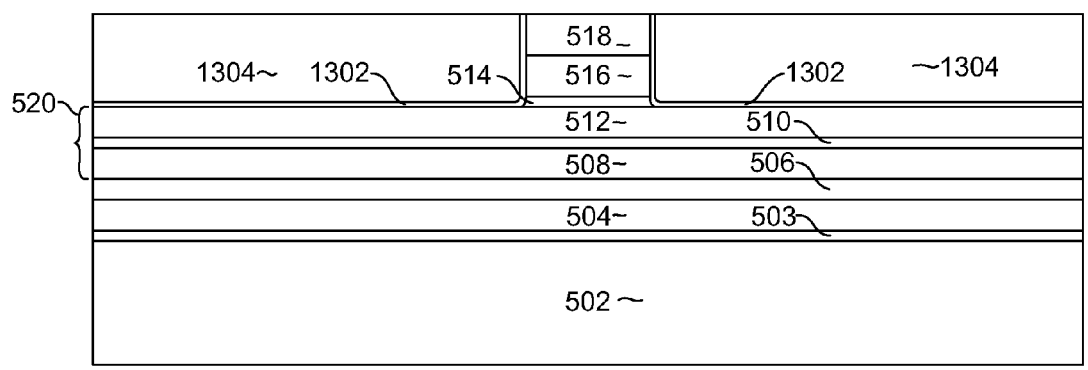

With reference now to FIG. 13, a thin, non-magnetic insulation layer such as alumina or silicon nitride 1302 is deposited followed by a soft magnetic side shield material such as NiFe 1304. A mask liftoff process is then performed to remove the mask 1002 (FIG. 12) and a planarization process, such as chemical mechanical polishing (CMP) is performed, leaving a structure as shown in FIG. 13.

Figure 14:
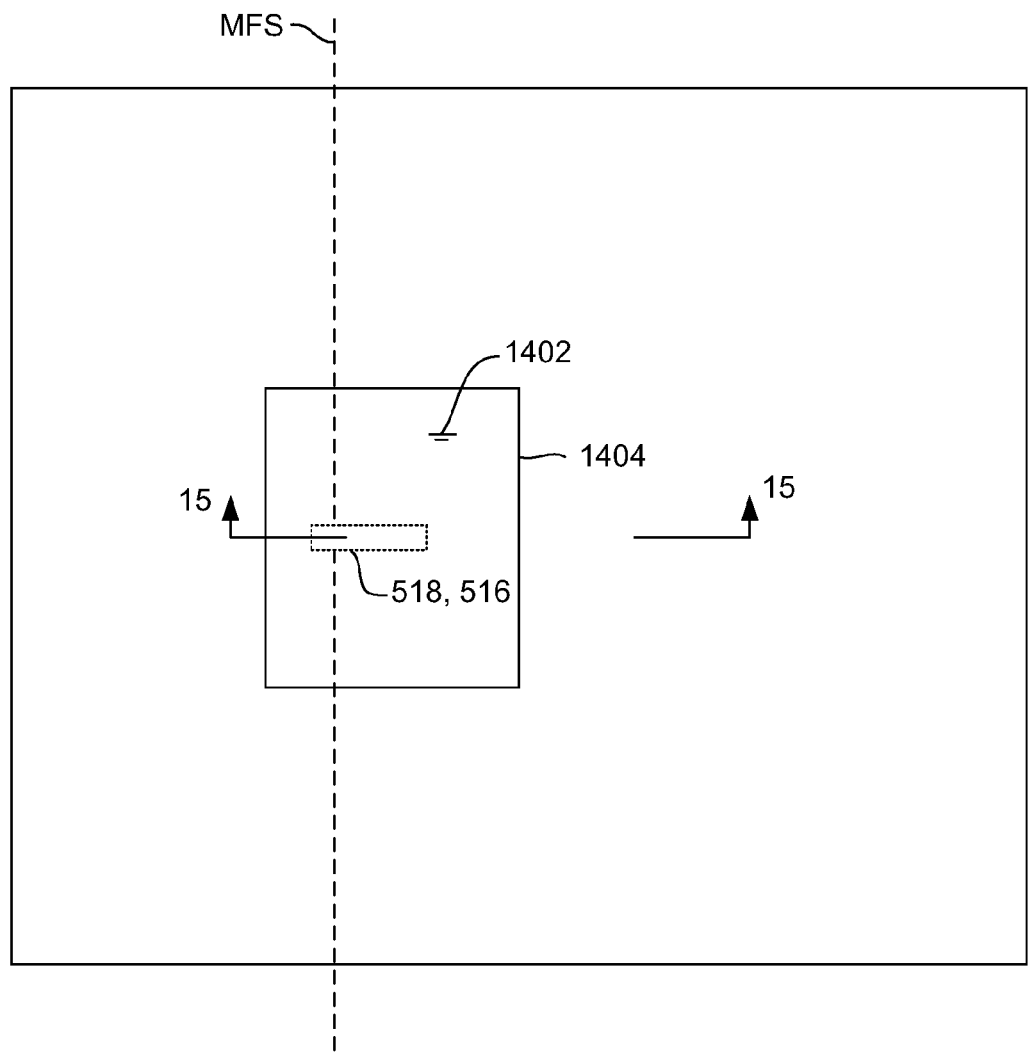
Figure 15:
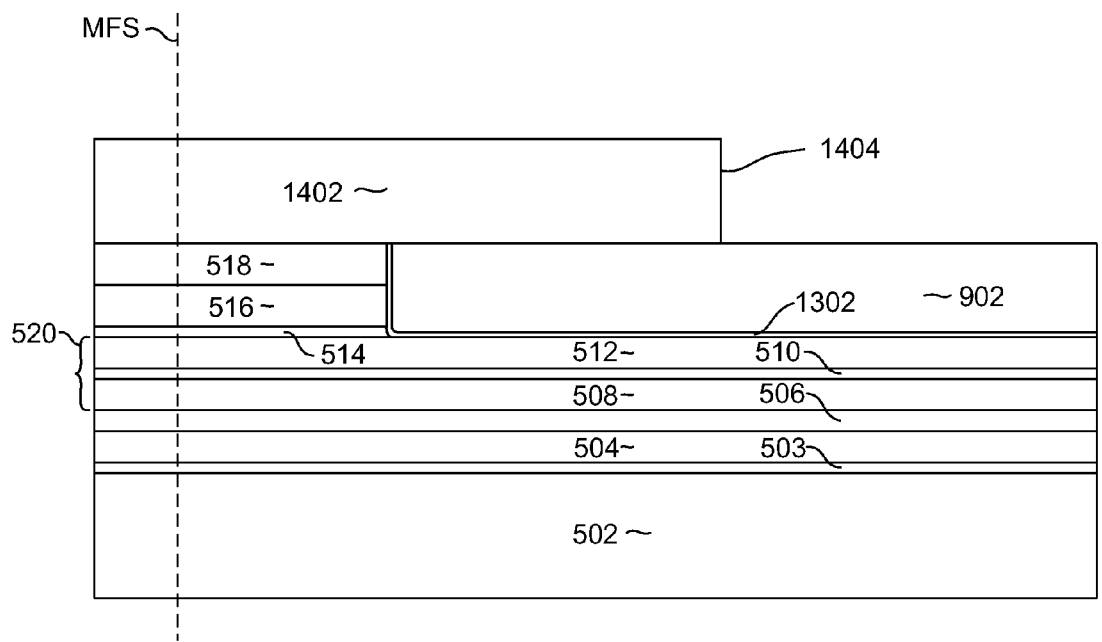
Figure 16:
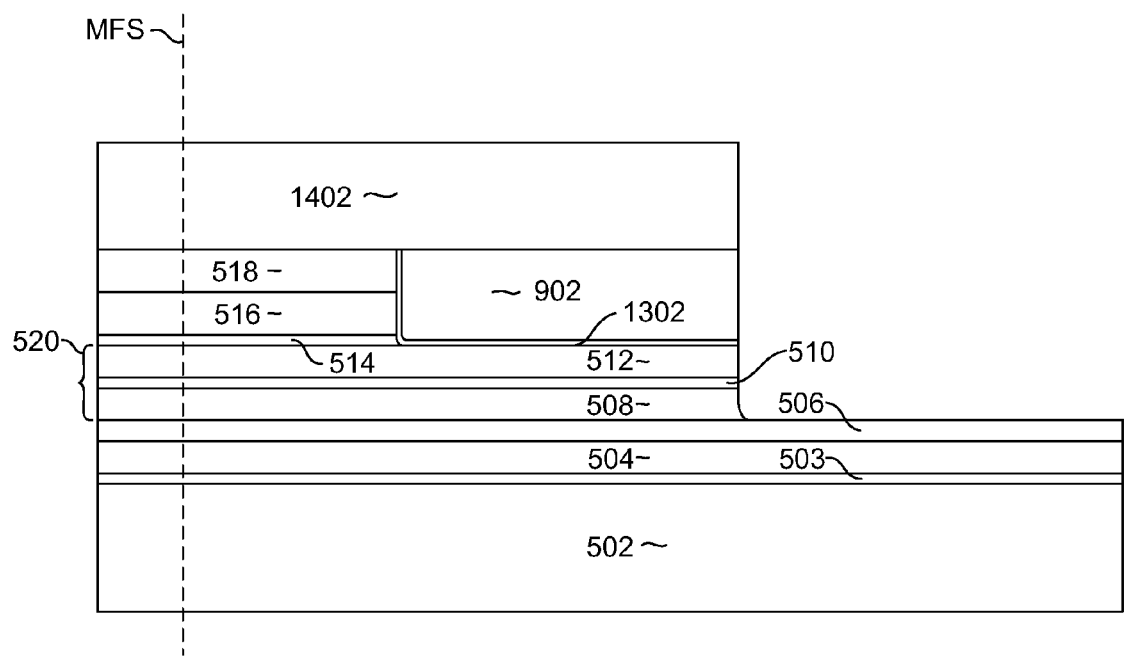
Figure 17:
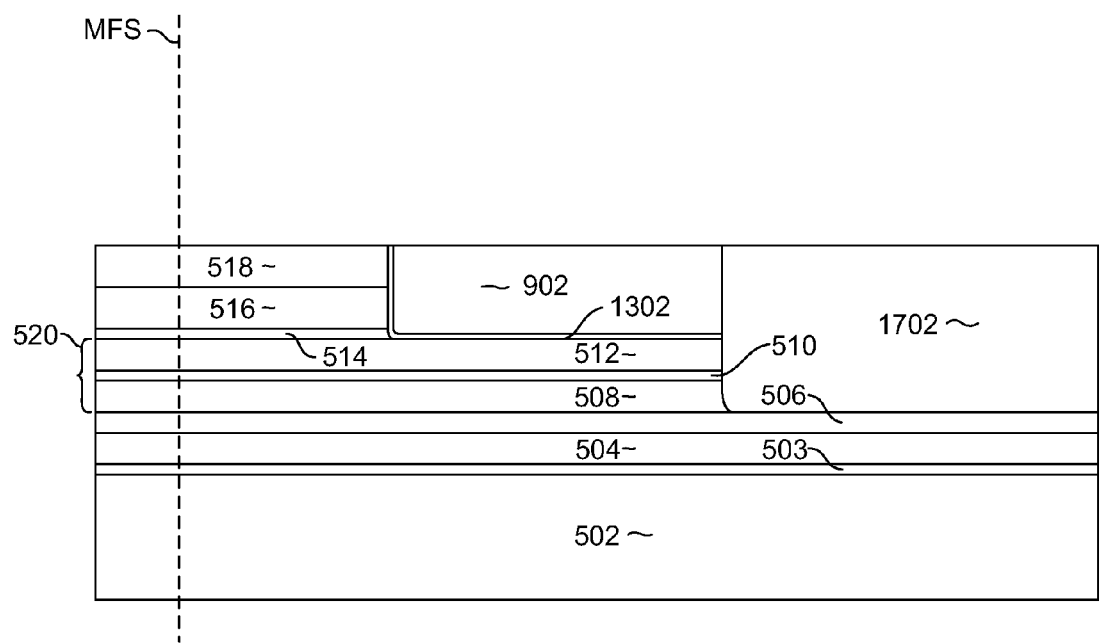

With reference now to FIGS. 14 and 15, a third mask structure 1402 is formed. FIG. 14 is a top down view, and FIG. 15 is a side cross sectional view as seen from line 15-15 of FIG. 14. The mask 1402 has a back edge 1404 that is configured to define a stripe height of the pinned layer structure 520. As before, the third mask structure 1402 can include a photolithographically patterned photoresist. As shown in FIG. 16, after the mask 1402 has been formed, a third ion milling is performed to remove portions of the pinned layer structure 520 that are not protected by the mask 1402. The third ion milling is terminated before removing the seed layer 504 and AFM layer 506. Therefore, the seed layer 504 and AFM layer 506 extend beyond the pinned layer structure 520. It should be pointed out that the pinned seed layer 504 and AFM layer 506 also extend beyond the pinned layer structure 520 in the width direction. A non-magnetic, electrically insulating fill layer such as alumina or tantalum oxide 1702 can be deposited, and a mask liftoff, leaving a structure as shown in FIG. 17.

Figure 18:
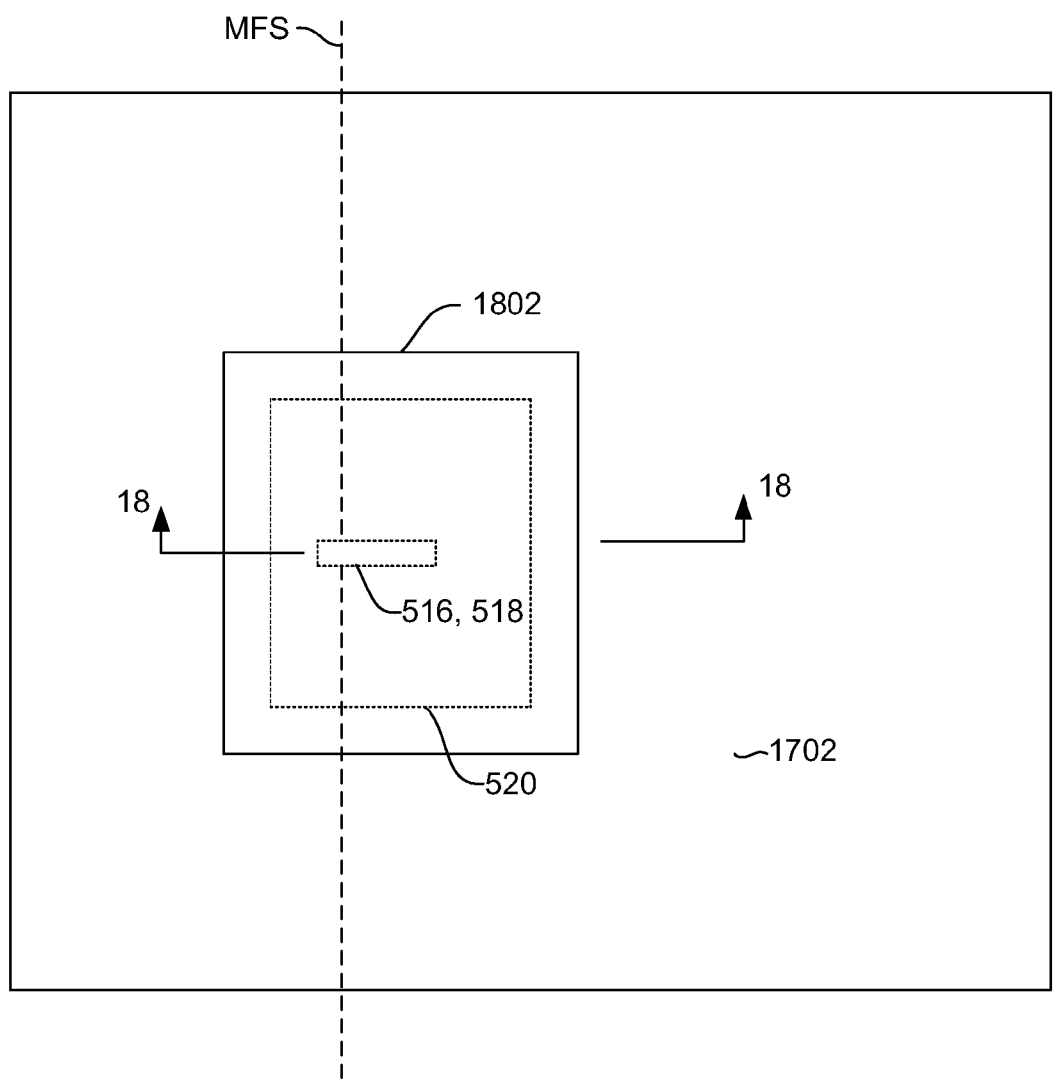
Figure 19:
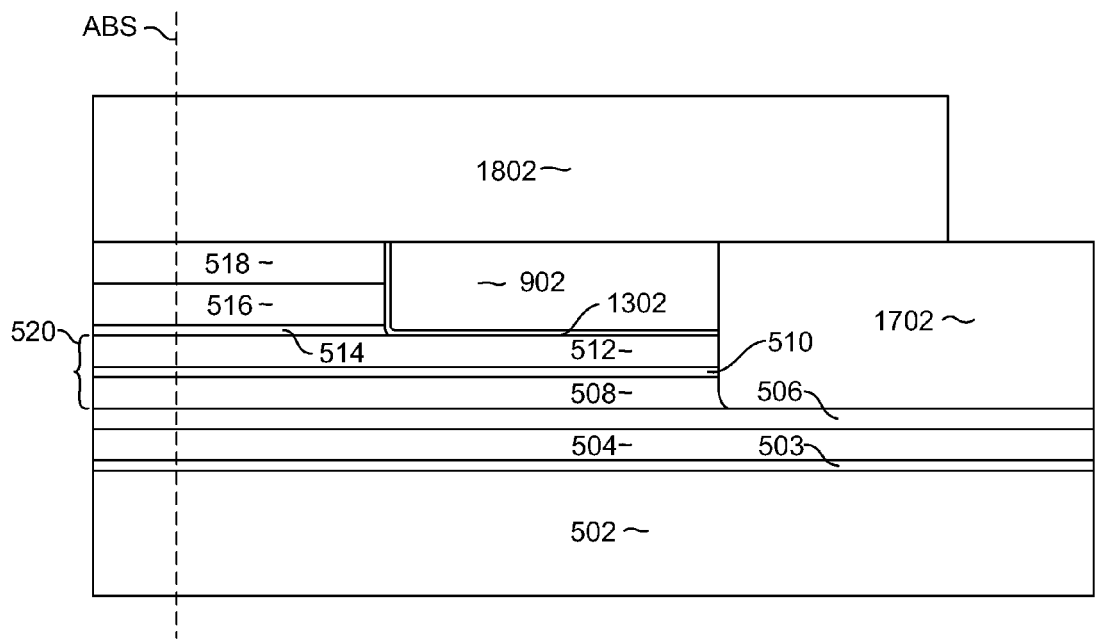
Figure 20:
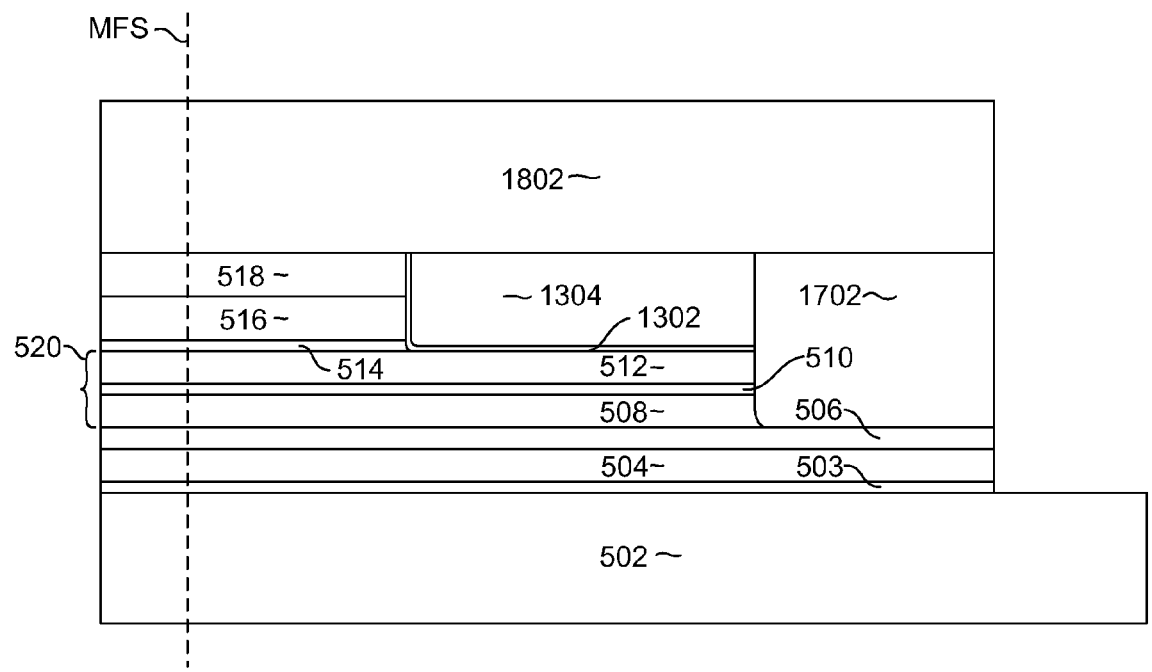
Figure 21:
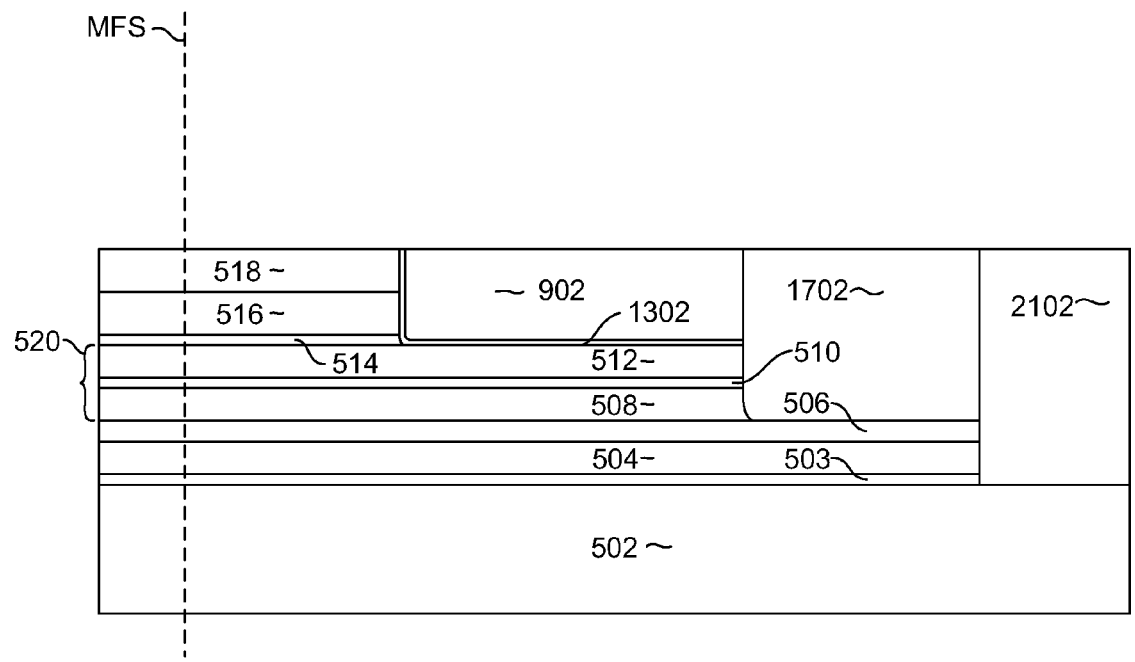
Figure 22:
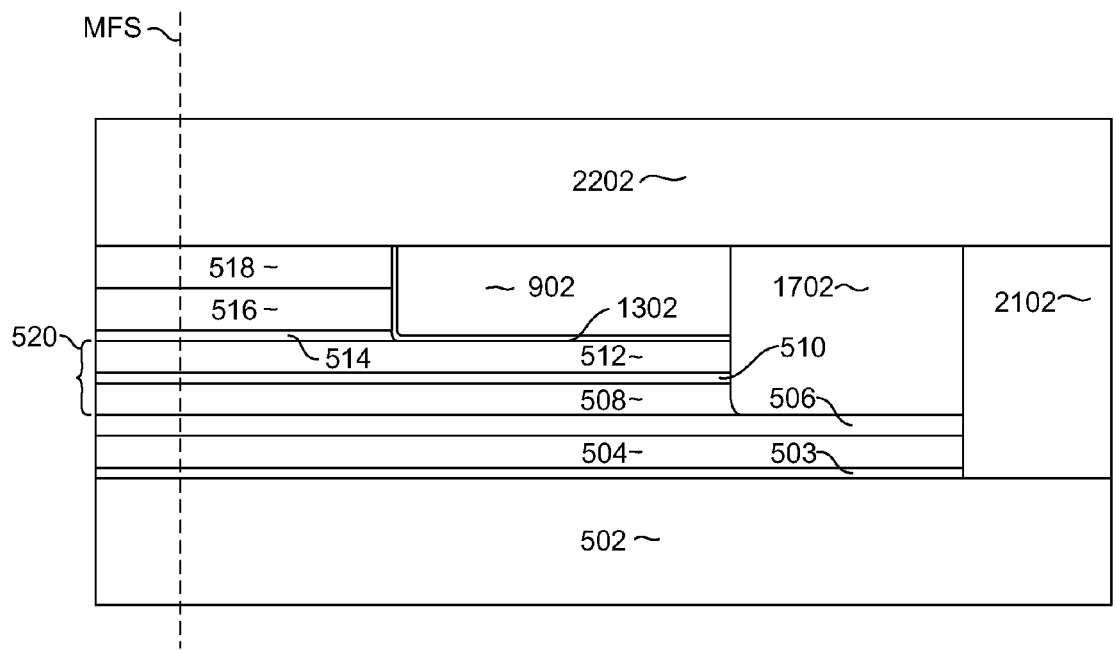

With reference now to FIGS. 18 and 19, a fourth mask 1802 can be constructed having an outer edge that extends slightly beyond the outer edge of the pinned layer structure 520, which was defined by the previously described masking and ion milling processes. FIG. 18 is a top down view and FIG. 19 is a side cross sectional view as seen from line 19-19 of FIG. 18. In FIG. 18, the location of the free layer structure 516 and capping layer structure 518 is indicated by dotted line, and the locations of the previously defined pinned layer structure 520 is indicated by dotted line to indicate that they are beneath the mask structure 1802. The mask 1802 has an outer dimension that is configured to define an outer dimension of the seed layer 504 and AFM layer 506, as will be seen. As before, the mask 1802 can include photolithographically patterned photoresist material, but can include other layers such as a polymethylglutarimide (PMGI) such as that produced by MICROCHEM®. With reference to FIG. 20, another ion milling is performed to remove material not protected by the mask 1802, thereby defining an outer edge of the seed layer 504 and AFM layer 506. Another non-magnetic fill layer such as alumina 2102 can then be deposited, and a mask liftoff process can be performed, leaving a structure as shown in FIG. 21. Then, with reference to FIG. 22, an upper magnetic shield 2202 can be formed by a method such as electroplating.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic sensor, comprising:
    a seed layer structure;
    a magnetic pinned layer structure formed over the seed layer structure; and
    a non-magnetic layer formed over the pinned layer structure; and
    a magnetic free layer structure formed over the non-magnetic layer; wherein
    the magnetic free layer structure extends to a first stripe height measured from a media facing surface;
    the magnetic pinned layer structure extends to a second stripe height measured from the media facing surface that is greater than the first stripe height; and
    the seed layer structure extends to a third stripe height measured from the media facing surface that is greater than the first and second stripe heights;
    wherein the free layer structure has a width that defines a sensor track-width, and wherein the seed layer structure and pinned layer structure extend laterally beyond the track-width.

2. The magnetic sensor as in claim 1, wherein the seed layer structure comprises a magnetic material.

3. The magnetic sensor as in claim 1, wherein the seed layer structure comprises NiFe.

4. The magnetic sensor as in claim 1, wherein the seed layer structure comprises a layer of magnetic material sandwiched between first and second layers of Ru.

5. The magnetic sensor as in claim 1, wherein the seed layer structure comprises a layer of NiFe sandwiched between first and second layers of Ru.

6. The magnetic sensor as in claim 1, wherein the seed layer structure comprises a layer of NiFe sandwiched between first and second layers of Ru, the NiFe and first and second layers of Ru being formed on a layer of CoHf.

7. The magnetic sensor as in claim 1, wherein the seed layer structure extends laterally beyond the pinned layer structure.

8. A magnetic data recording system, comprising:
a housing;
a magnetic media moveably held within the housing;
a slider held within the housing to face the magnetic media; and
a read sensor formed on the slider, the read sensor further comprising:
a seed layer structure;
a magnetic pinned layer structure formed over the seed layer structure; and
a non-magnetic layer formed over the pinned layer structure; and
a magnetic free layer structure formed over the non-magnetic layer; wherein
the magnetic free layer structure extends to a first stripe height measured from a media facing surface;
the magnetic pinned layer structure extends to a second stripe height measured from the media facing surface that is greater than the first stripe height; and
the seed layer structure extends to a third stripe height measured from the media facing surface that is greater than the first and second stripe heights;
wherein the free layer structure has a width that defines a sensor track-width, and wherein the seed layer structure and pinned layer structure extend laterally beyond the track-width.

9. The magnetic data recording system as in claim 8, wherein the seed layer structure comprises a magnetic material.

10. The magnetic data recording system as in claim 8, wherein the seed layer structure comprises NiFe.

11. The magnetic data recording system as in claim 8, wherein the seed layer structure comprises a layer of magnetic material sandwiched between first and second layers of Ru.

12. The magnetic data recording system as in claim 8, wherein the seed layer structure comprises a layer of NiFe sandwiched between first and second layers of Ru.

13. The magnetic data recording system as in claim 8, wherein the seed layer structure comprises a layer of NiFe sandwiched between first and second layers of Ru, the NiFe and first and second layers of Ru being formed on a layer of CoHf.

14. The magnetic data recording system as in claim 8, wherein the seed layer structure extends laterally beyond the pinned layer structure.

* * * * *